United States Patent [19]

Scharf et al.

[11] 3,983,268
[45] Sept. 28, 1976

[54] PROCESS FOR SURFACE SIZING PAPER

[75] Inventors: Emil Scharf, Ludwigshafen; Herbert Naarmann, Wattenheim; Fritz Reichel, Eppelheim, all of Germany

[73] Assignee: BASF Aktiengesellschaft, Ludwigshafen (Rhine), Germany

[22] Filed: Nov. 11, 1974

[21] Appl. No.: 522,631

[52] U.S. Cl. .............. 427/341; 260/29.6 T; 260/29.6 TA; 427/342; 427/391
[51] Int. Cl.² ............................ B05D 3/02
[58] Field of Search ............. 427/341, 342, 391; 428/511, 514; 260/80.73, 80.8, 86.7, 88.1 PA, 29.6 T, 29.6 TA

[30] Foreign Application Priority Data
Nov. 15, 1973 Germany ................. 2357064

[56] References Cited
UNITED STATES PATENTS

| | | | |
|---|---|---|---|
| 3,297,614 | 1/1967 | Pueschner et al. | 260/29.6 TA |
| 3,513,120 | 5/1970 | Pohlemann et al. | 260/29.6 T |
| 3,766,151 | 10/1973 | Huang | 260/80.73 |

FOREIGN PATENTS OR APPLICATIONS

| | | | |
|---|---|---|---|
| 577,917 | 6/1959 | Canada | 427/391 |
| 747,448 | 11/1966 | Canada | 427/391 |

Primary Examiner—Michael R. Lusignan
Attorney, Agent, or Firm—Johnston, Keil, Thompson & Shurtleff

[57] ABSTRACT

Process for the manufacture of surface-sized papers by impregnating a paper with a solution containing a water-soluble salt of a random polymer based on α-olefins and ethylenically unsaturated acids and a compound of the formula:

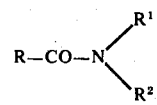

wherein R is alkyl, aryl or a radical of the formula:

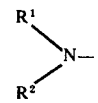

and $R^1$ and $R^2$ each independently denotes H, R or a radical of the formula:

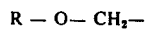

and drying the impregnated paper. Very well sized papers are obtained which show alkali resistance and filler compatibility.

7 Claims, No Drawings

PROCESS FOR SURFACE SIZING PAPER

This application discloses and claims subject matter described in German Patent Application No. P 23 57 064.1, filed Nov. 15, 1973, which is incorporated herein by reference.

This invention relates to a process for surface-sizing paper using a solution of a water-soluble salt of a random copolymer composed of, as characteristic comonomers, a. from 50 to 90% by weight of α-olefins of from 2 to 12 carbon atoms,
b. from 50 to 10% by weight of acrylic acid and/or methacrylic acid and, optionally,
c. up to 30% by weight of non-basic polymerizable compounds, and which has a K value of from 20 to 40.

It is well known to engine-size paper using rosin and related substances (sizes) and aluminum(III) or iron-(III) salts. German Published Application No. 2,040,692 discloses a method of sizing paper with the aid of water-soluble salts of random copolymers of an olefin of from 2 to 12 carbon atoms and acrylic and/or methacrylic acid and optionally containing up to 30% of other non-basic polymerizable compounds. However, the degree of sizing of the papers thus produced and the processability of the aqueous solution of salts of the random copolymer are unsatisfactory.

It is an object of the invention to modify the above process so as to produce better sizing and improved processability of the polymer solutions.

This object is achieved, in the present invention, by employing the said process except that the solution additionally contains from 0.1 to 20% by weight of a compound of the general formula:

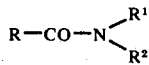

in which R is alkyl, aryl or a radical of the formula:

and $R^1$ and $R^2$ each independently denotes H, R or a radical of the formula

The α-olefins (a) forming one component of the copolymers preferably contain from 2 to 8 carbon atoms. A particularly suitable α-olefin is styrene. The proportion of these comonomers should preferably be from 60 to 85% by weight. The preferred comonomer (b) is acrylic acid and suitable comonomers (c) are for example acrylonitrile, methacrylonitrile, acrylamide, methacrylamide, $C_{1-4}$ alkyl esters of acrylic acid and methacrylic acid and vinyl esters of $C_{2-4}$ alkanoic acids and vinyl chloride.

The copolymers are prepared in known manner by suspension or solution polymerization in aliphatic, cycloaliphatic or aromatic hydrocarbons including, for example, α-olefins such as ethylene, propene, isobutene or alcohols such as ethylene glycol, isopropanol and isobutanol, at temperatures between 60° and 130°C and in the presence of free-radical initiators such as azo compounds, peroxides and hydroperoxides, e.g. azobisisobutyronitrile and lauroyl peroxide. Chain stoppers may also be present during polymerization, for example carbon tetrachloride, cyclohexane and lauroyl mercaptan. Preferably, the copolymers are prepared by solution polymerization in a primary or secondary $C_{1-4}$ alcohol or alcohol mixture at temperatures of from 80° to 120°C. The initiators are preferably used in amounts of from 0.01 to 1% by weight of the comonomers and the chain stoppers in amounts of from 0.001 to 0.5% by weight.

In order to prepare a highly random copolymer, it is recommended that the monomer (b) is first placed in the vessel and the remaining monomers are added in the course of polymerization. The solids content of the dispersion is from 10 to 50% and preferably from 25 to 35%, by weight.

In order to render the copolymers, which contain free carboxyl groups or anhydride groups, water-soluble, they are converted to their salts with bases in the usual manner, although it is not necessary to neutralize all of the carboxyl groups, since generally a degree of neutralization of 80%, based on the total number of carboxyl groups, is sufficient. The concentration of the salt of the random copolymer in the solution is from 0.1 to 5% and preferably from 0.4 to 3%, by weight.

Suitable cations are, in particular, ammonium or mono-, di- or tri-alkylammonium having a total of up to 6 carbon atoms and also for example sodium and/or potassium. These cations are introduced into the copolymers by converting them with, inter alia, ammonia and the free organic amines or caustic alkalis. To bind the free ammonia or amines it has been found advantageous to add formaldehyde or other aliphatic aldehydes such as glyoxal, which may be used in amounts of from 0.5 to 25%, based on the weight of copolymer.

According to the invention, the solution of a water-soluble random copolymer of an olefin and acrylic and/or methacrylic acid used for surface-sizing of paper is blended with from 0.1 to 20% by weight, based on the solution, of a compound of the general formula:

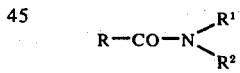

in which R is alkyl, aryl or a radical of the formula:

and $R^1$ and $R^2$ each independently denotes H, R or a radical of the formula:

Suitable compounds of the general formula:

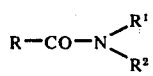

are for example formamide, dimethyl formamide, acetamide, dimethyl acetamide, urea and substituted ureas. We prefer to use urea, dimethyl acetamide and substituted ureas such as N-dimethyl urea, ethylene urea, propylene urea, dimethoxymethylol urea and dimethylol urea.

The substituent R may be alkyl of from 1 to 12 carbon atoms, aryl, optionally substituted, or an $NH_2$ group in which one or both of the hydrogen atoms may be replaced by substituents. Suitable substituents are the groups designated by R. By alkyl groups we include cycloalkyl groups in which the carbon ring contains from 3 to 12 carbon atoms. The cycloalkyl groups may also carry substituents.

The amount of copolymer required for paper sizing is from about 0.05 to 5% and preferably from 0.1 to 1.5%, by weight of the fibrous substance. If aluminum(III) or iron(III) salts such as aluminum sulfate or iron sulfate are included in the size, the preferred ratio of copolymer to these cations is from 1:10 to 1:300, by weight.

For white papers it is recommended to use aluminum salts, whilst iron(III) salts can be used where a brownish yellow tinge is acceptable, in both cases the amount used being from about 0.005 to 0.5% and preferably from 0.02 to 0.1% of cation, by weight of the fibrous substance. It is advantageous to add the salts to the pulp but it is also possible to impregnate the finished paper with a solution of the salts prior to treatment with the copolymer.

In addition to the solution of a salt of a copolymer and a compound of the general formula:

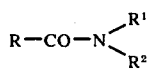

used in the process of the invention for surface-sizing paper, it is possible to include other non-ionic or anionic sizing agents such as rosin size. Generally speaking, the novel agents show good compatibility with paper auxiliaries such as fillers, pigments, dyes, wet-strengtheners, brighteners and other agents. This applies to the manufacture of sized papers of all thicknesses and types including, for example, papers and cardboards of bleached and unbleached sulfite cellulose or sulfate cellulose and groundwood.

The method of sizing employed when using our novel agents is the same as the conventional methods of surface-sizing and, consequently, no further details are required in this specification. A web of paper is impregnated and then dried. The additives of the invention are ineffective when added to the suspension of fibers prior to sheet formation.

In accordance with the object of the invention, there are obtained very well sized papers. The solutions used for this surface-sizing exhibit good filler-compatibility and improved processability over solutions not containing the additives of the invention: for example, it is easier to form a homogeneous mixture with water.

In the following Examples the percentages are by weight unless otherwise stated. The K values of the copolymers were determined by the method proposed by H. Fikentscher in Cellulosechemie 13, pp. 58–64 and 71–74 (1932) on 0.5% dimethyl formamide solutions at 20°C. K denotes $k \times 10^3$.

EXAMPLE 1

An approximately 0.5% fiber suspension of 100% bleached sulfite cellulose is processed to a paper weighing 80 g/m² in the usual manner. This paper is then impregnated with an aqueous solution, which contains 2.4% of the ammonium salt (90% salt) of a random solution copolymer of 80% of styrene and 20% of acrylic acid and having a K value of 32 and 10% of urea, based on the weight of the total solution, the dry pickup being 1.2% based on the weight of the paper, which is then dried.

For the purpose of comparison, the same paper was engine-sized in conventional manner with the same weight of rosin size, since this method gives the closest sizing effect.

The degree of sizing was then determined by the Cobb test (DIN mold 53/21-1 min.) and by the ink flotation test (test ink as laid down by DIN 53,126).

The results were as follows:

| Paper | Cobb test after 1 min. | Ink flotation test |
| --- | --- | --- |
| unsized | 140 | strike-through in 0.5 min. |
| conventionally sized (engine-sized) | 50 | strike-through in 3.0 min. |
| invention | 18 | strike-through in 4.0 min. |
| invention plus 0.5% of aluminum sulfate, based on fiber | 16 | strike-through in 5.5 min. |

EXAMPLE 2

A fiber suspension (38°SR) of 30% of groundwood and 70% of bleached cellulose and containing 14% of kaolin, based on the weight of fiber substance, is processed to paper in the usual manner and treated with the sizing agents described in Example 1.

The quality of the results obtained is demonstrated in the following Table:

| Paper | Cobb test 1 min. | 5 min. | Ink flotation test |
| --- | --- | --- | --- |
| unsized | 120 | 130 | strike-through in 1 min. |
| conventionally sized (engine-sized) | 15 | 60 | strike-through in 6 min. |
| invention | 15 | 21 | strike-through in 12 min. |
| invention plus 1% of aluminum sulfate, based on fiber | 14 | 23 | strike-through in 13 min. |

EXAMPLE 3

A fiber suspension of 100% bleached sulfite cellulose containing 12% of kaolin is processed in conventional manner to paper weighing 80 g/m² and is then impregnated with an aqueous solution containing 1.5% of the ammonium salt (100% salt) of a copolymer of 85% of ethylene and 15% of acrylic acid and having a K value of 20, 10% of dimethyl acetamide and 2% of oxidatively degraded starch thus rendered soluble in hot water, the dry pickup being about 1.5%.

For the purpose of comparison, an engine-sized paper is produced in known manner, in which the above copolymer is replaced by an equal weight of rosin size.

The results obtained in tests on the sizing effect are given in the following Table:

| Paper | Cobb test after 1 min. | Ink flotation test |
|---|---|---|
| unsized | 110 | strike-through in 2 min. |
| coventionally sized (engine-sized) | 60 | strike-through in 4 min. |
| invention | 17 | strike-through in 5 min. |
| invention plus 3% of aluminum sulfate, based on fiber | 15 | strike-through in 10 min. |

EXAMPLE 4

A fiber suspension of bleached sulfite cellulose (100%) containing 12% of kaolin and 1% of a commercially available anionic urea/formaldehyde resin wet-strengthener was processed in conventional manner to a paper weighing 80 g/m². The paper is then impregnated with an aqueous solution containing 2.5% of the methylammonium salt (80% salt) of a copolymer of 85% of styrene and 15% of methacrylic acid and having a K value of 25 and 15% of N-dimethyl urea, based on the weight of the solution. The dry pickup is 1.8% and in a parallel test it is 0.9%.

For the purpose of comparison, the same paper was engine-sized in conventional manner using an equal weight of resin size together with the same wet-strengthener. The results of the Cobb test were as follows:

| Paper | Cobb test 5 min. |
|---|---|
| unsized | 112 |
| engine-sized in conventional manner | 45 |
| invention, dry pickup 0.9% | 17 |
| invention, dry pickup 1.8% | 15 |
| invention plus 3% of aluminum sulfate | 10 |

EXAMPLE 5

A fiber suspension of bleached sulfite cellulose (100%) is processed in conventional manner to a paper weighing 80 g/m² and individual tests are carried out in which this paper is surface-sized (dry pickup 0.8%) with different aqueous solutions containing 0.5% of the ammonium salt (90% salt) of a copolymer of 50% of α-olefin and 50% of acrylic acid as listed in the following Table and also containing 5.0%, based on the solution, of ethylene urea. The data obtained in the ink flotation test and Cobb test are listed below:

| α-olefin | K value of copolymer | ink resistance | Cobb test 5 min. |
|---|---|---|---|
| H₂C=CH₂ | 33 | very good | 24 |
| H₂C=CH—CH₃ | 34 | very good | 20 |
| H₂C=C(CH₃)CH₃ | 29 | very good | 18 |

EXAMPLE 6

A fiber suspension of bleached sulfite cellulose (100%) containing 0.5% of sodium aluminate is processed in conventional manner to a paper weighing 80 g/m², which is then surface-sized (dry pickup 1.0%) with an aqueous solution containing 0.5% of the ammonium salt (90% salt) of a copolymer of 80% of styrene and 20% of acrylic acid and having a K value of 36 and 5%, based on the weight of the total solution, of propylene urea. In the ink flotation test, the resulting sized paper gave a value of 11 min (for strike-through).

EXAMPLE 7

A fiber suspension of bleached sulfite cellulose (100%) is processed in conventional manner to a paper weighing 80 g/m² which is then surface-sized (dry pickup 1.4%) with an aqueous solution containing 0.5% of the ammonium salt (85% salt) of a copolymer of 85% of styrene and 15% of acrylic acid and having a K value of 20 and 10% of CH₃O—CH₂—NH—CO—NH—CH₂—OCH₃ (dimethoxymethylol urea). The results were excellent, the value obtained in the Cobb test (5 min.) being about 18.

EXAMPLE 8

A fiber suspension of 30% of groundwood and 70% of bleached cellulose and containing 15% of kaolin and 3% of aluminum sulfate is processed in the usual manner to a paper weighing 80 g/m². This paper is then surface-sized (dry pickup 1.2%) with an aqueous solution containing 2% of starch rendered soluble in hot water, 0.5% of the ammonium salt (90% salt) of a copolymer of 80% of styrene, 1.5% of acrylic acid and 5% of acrylonitrile and having a K value of 32 and 10% of dimethylol urea. The ink floating time of the resulting sized paper was about 16 minutes and the Cobb test gave values of 16 (1 min.) and 21 (5 min.).

EXAMPLE 9

A fiber suspension of bleached sulfite cellulose (100%) containing 2% of iron(III) chloride is processed in the usual manner to a paper weighing 80 g/m², which is then surface-sized (dry pickup 0.8%) with an aqueous solution containing 2% of the ammonium salt (95% salt) of a copolymer of 80% of styrene, 15% of methacrylic acid and 5% of methacrylonitrile and having a K value of 32 and 5% of dimethyl acetamide. The yellowish-brown sized paper thus obtained showed good ink resistance.

We claim:

1. A process for the manufacture of surface-sized paper by impregnating paper with an aqueous solution containing 0.1 to 5% by weight of salts of random copolymers obtained by copolymerization of
   a. from 50 to 90% by weight of α-olefins of from 2 to 12 carbon atoms and
   b. from 50 to 10% by weight of acrylic acid, methacrylic acid or mixtures thereof and neutralization thereof to give copolymers having K values of from 20 to 40, and from 0.1 to 20% by weight of a compound of the formula:

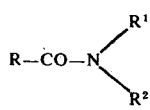

where R is a group selected from alkyl, aryl and radicals of the formula:

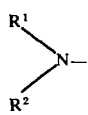

and $R^1$ and $R^2$ each independently denotes H, R or a radical of the formula:

$$R - O - CH_2 -$$

and drying the impregnated paper.

2. A process as set forth in claim 1, wherein the salt of the random copolymer is obtained by copolymerization of (a), (b) and, as addition comonomers, (c) up to 30% by weight of non-basic polymerizable compounds selected from the group consisting of acrylonitrile, methacrylonitrile, acrylamide, methacrylamide, $C_{1-4}$ alkyl esters of acrylic and methacrylic acids, vinyl esters of $C_{2-4}$ alkanoic acids and vinyl chloride.

3. A process as set forth in claim 1, wherein the random copolymer is obtained by solution polymerization in a primary or secondary $C_{1-4}$ alcohol or alcohol mixture at from 60° to 130°C.

4. A process as set forth in claim 1, wherein the aqueous solution contains urea as the compound of the formula:

$$R-CO-N\begin{matrix}R^1\\R^2\end{matrix}.$$

5. A process as set forth in claim 1, wherein the paper is additionally impregnated with from 0.005 to 0.5% of cation by weight based on the weight of the paper of aluminum(III) salts or iron(III) salts.

6. A process as set forth in claim 1 wherein said compound is selected from the group consisting of urea, dimethyl acetamide, N-dimethyl urea, ethylene urea, propylene urea, di- methoxymethylol urea and dimethylol urea.

7. A process as set forth in claim 6 wherein the amount of salts of random copolymers contained in said aqueous solution is from 0.4 to 3% by weight.

* * * * *